W. L. CLAUSE & R. S. PEASE.
GLASS DRAWING APPARATUS.
APPLICATION FILED JAN. 23, 1914.
1,199,763.
Patented Oct. 3, 1916.
2 SHEETS—SHEET 1.
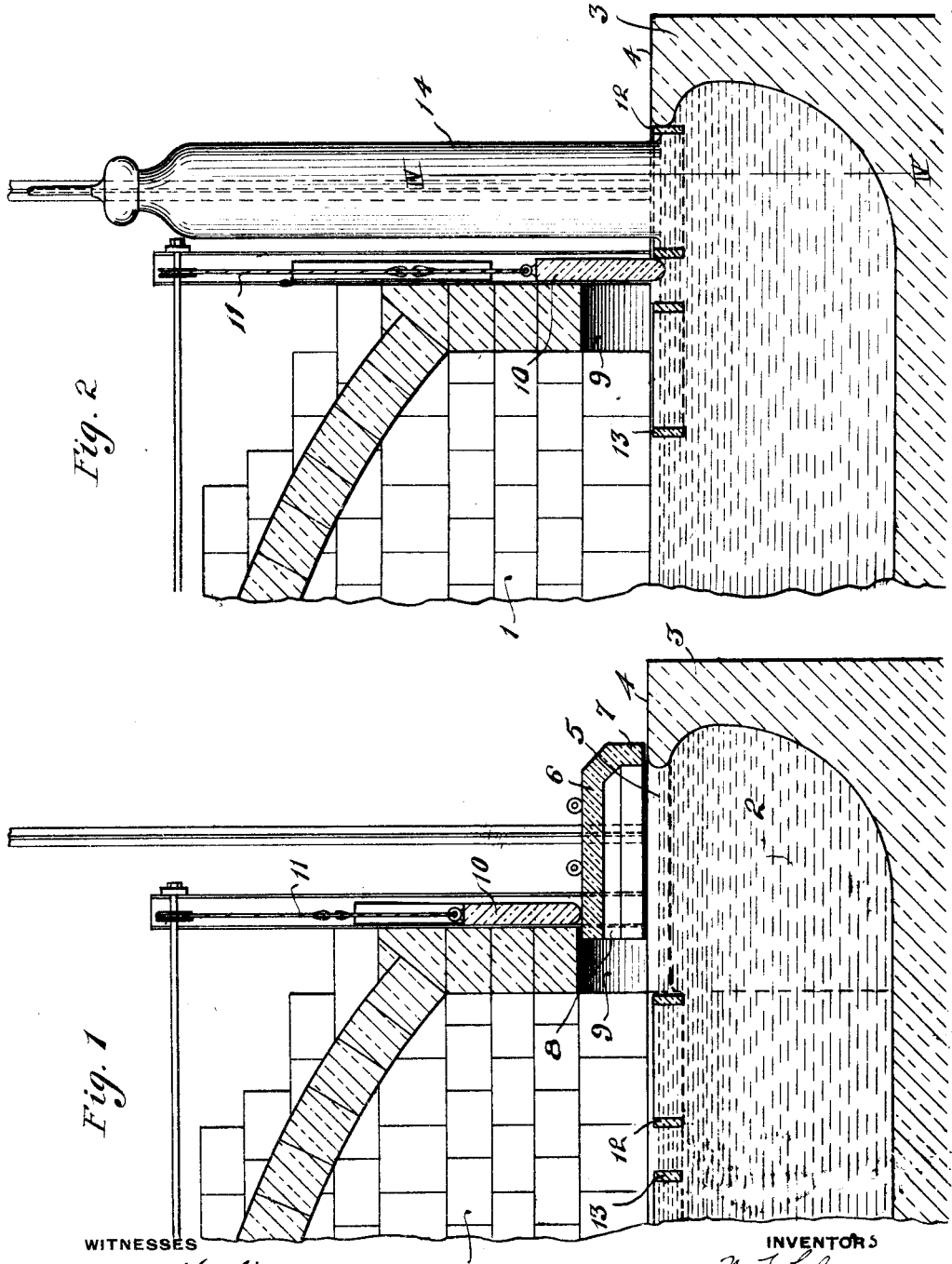

W. L. CLAUSE & R. S. PEASE.
GLASS DRAWING APPARATUS.
APPLICATION FILED JAN. 23, 1914.
1,199,763.
Patented Oct. 3, 1916.
2 SHEETS—SHEET 2.
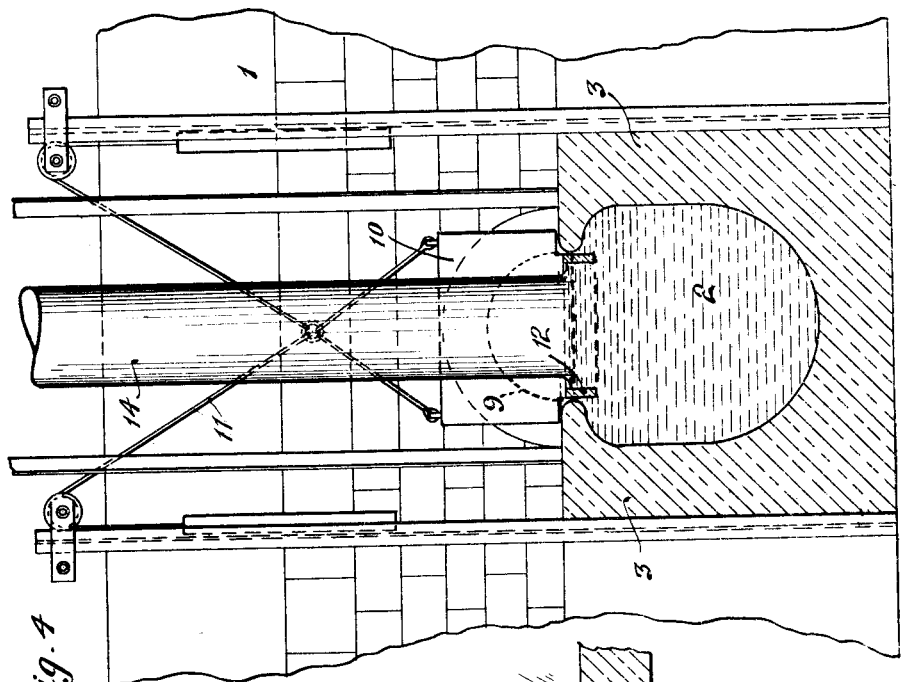
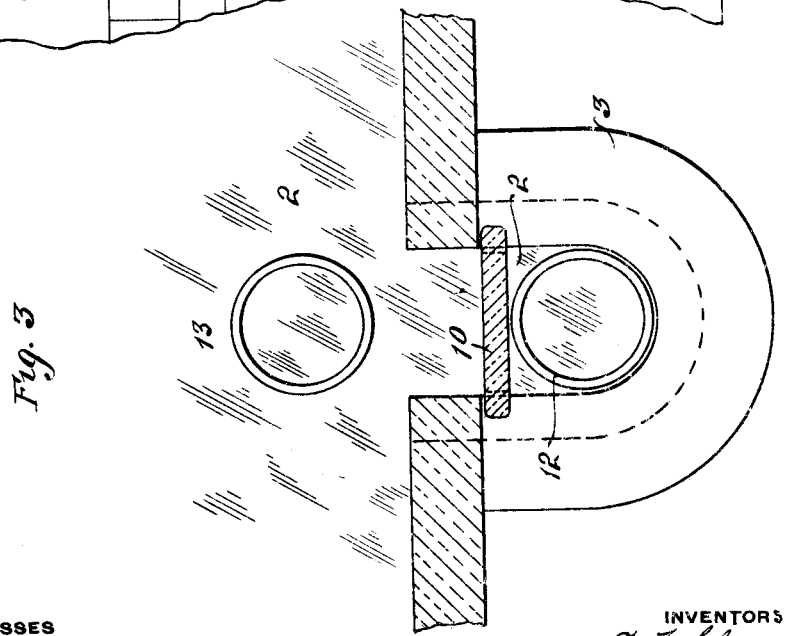
WITNESSES
INVENTORS

UNITED STATES PATENT OFFICE.

WILLIAM L. CLAUSE AND ROGER S. PEASE, OF PITTSBURGH, PENNSYLVANIA, ASSIGNORS TO PITTSBURGH PLATE GLASS COMPANY, OF PITTSBURGH, PENNSYLVANIA, A CORPORATION OF PENNSYLVANIA.

GLASS-DRAWING APPARATUS.

1,199,763.  Specification of Letters Patent.  Patented Oct. 3, 1916.

Application filed January 23, 1914. Serial No. 813,883.

*To all whom it may concern:*

Be it known that we, WILLIAM L. CLAUSE and ROGER S. PEASE, both citizens of the United States, and both residing at Pittsburgh, in the county of Allegheny and State of Pennsylvania, have invented certain new and useful Improvements in Glass-Drawing Apparatus, of which the following is a specification.

The invention relates to the art of glass drawing, and particularly to the drawing of glass cylinders for the making of window glass. The invention has for its objects, the provision of a simplified apparatus for securing a more rapid drawing operation with the elimination of the major portion of the delay incident to the cooling and reheating ordinarily occurring in connection with the operation of drawing direct from a tank. The apparatus preferably employed is illustrated in the accompanying drawings, wherein—

Figure 1 is a partial section through a glass drawing tank embodying our invention, with the parts in one position of use. Fig. 2 is a section similar to that of Fig. 1, but with the parts in another position, Fig. 3 is a partial horizontal section taken through the tank above the drawing extension, and Fig. 4 is a vertical section taken on the line IV—IV of Fig. 2.

Referring to the drawings, 1 is the glass melting tank which may be of any approved form and which is provided with a roofless drawing extension or tank 2. This drawing extension has its side walls 3 of less height than is customary in drawing extensions, so that the top surface 4 thereof lies just above the surface 5 of the glass.

Mounted removably upon the top of the extension 2 is a cover 6 provided with depending walls 7 upon three of its sides, the fourth side which comes next to the melting tank being open as indicated at 8 and registering with a passageway 9 lying above the surface of the glass. A vertically movable gate 10 operated from the cable 11, or any other suitable means, serves to close the passageway 9 when the cover is removed and the drawing operation is in progress, as indicated in Fig. 2.

Floating partially submerged in the glass are the drawing shells or rings 12 and 13. These drawing shells may be of various designs, and it will be understood that the invention is not limited to use with the particular style of container or shell illustrated. They are preferably made circular in cross section, and preferably arranged so that the body of glass contained therein is in free communication with the body of glass in which they float, so that as the glass is drawn from a ring a fresh supply flows in from beneath. The rings or shells are designed to bring a fresh supply of hot glass from the melting tank to position for drawing in the extension 2, and after the drawing operation, to carry the cold glass and the residue of the cylinder back into the melting tank.

Starting with the parts in the position illustrated in Fig. 1, the operation is as follows: The cover 6 is first removed and the ring 12 drawn over to the position indicated in Fig. 2, and the gate 10 is lowered as indicated in Fig. 2. After the glass in the ring 12 has cooled sufficiently—due to its exposure to the atmosphere—the usual bait is inserted in the glass and the drawing operation conducted in the usual way, the cylinder 14 being illustrated in the process of formation as indicated in Fig. 2. After the cylinder has been drawn to the proper length it is severed at the bottom either by a torch or blow pipe, or by raising the gate 10 and permitting the heat from the passageway 9 to melt off the bottom of the cylinder, after which the cylinder is removed and taken down in the usual way. The gate 10 is then raised, the ring 12 is pushed back into the melting tank, and the cover 6 positioned as indicated in Fig. 1. This operation places the chamber formed upon the lower side of the cover 6 in communication with the hot gases in the melting tank 1, and the glass in the extension 2 is brought up to the temperature of the glass in the melting tank. Another drawing ring 13 can then be brought into position in the extension and the operation repeated as above described. The manipulation of the rings as above described is advantageous, as the cold glass left in a ring after the drawing operation, and the residue of the cylinder, is gotten back into the melting tank and refined by exposure to a very high temperature, while the fresh ring which is brought into position contains fresh glass which has been very thoroughly refined in the melting tank.

Our invention also contemplates an alternative procedure wherein the cover 6 is not replaced after each draw, but in which the procedure in so far as the manipulation of the ring is concerned is substantially the same as that heretofore described, the ring being drawn into position in the drawing extension, and after the draw being pushed back into the melting tank and another ring from the melting tank floated into position for a draw. When this procedure is practised the cover would be used only when the apparatus is shut down for a considerable period, or at infrequent periods to secure the heating up of the glass in the extension 2 when such glass becomes unduly cool due to the continued exposure of the surface.

Our invention is designed primarily to do away with the necessity of using the so-called top stone hitherto used in drawing directly from a tank, and to decrease the interval between draws, thus increasing the capacity of the furnace employed. Where a perforate cover or top stone is employed upon a drawing tank the surface of the glass from which the draw is to occur is located a considerable distance below the roof or top stone, and as a result the cooling of the glass in the drawing ring is relatively slow and a considerable loss of time occurs, due to the slow cooling of the glass. It will be seen that with our apparatus this difficulty is remedied by getting the upper edge 4 of the wall of the drawing extension as close as possible to the surface of the glass, so that such surface is better exposed to the cooling action of the air. Under these conditions the glass in the drawing rings in the extension cools much more rapidly than is the case where a perforate roof or top stone is employed. The speed of operation is also greatly increased by the use of the movable drawing rings which are successively brought into position in the drawing extension. This is due to the fact that the cold glass which is left in a ring after the drawing operation need not be reheated or refined in the extension, but can be immediately pushed out into the melting tank and a new ring filled with fresh glass brought from the melting tank into the extension, so that no time need be wasted due to any reheating operation intermediate the draws, as is the case where a fixed drawing ring is employed in connection with a top stone.

It will be seen that the bringing of the surface of the glass in the extension closer to the top surface of the walls thereof is made possible by the use of the cover 6 with the depending walls, such cover providing the heating chamber or heating space required over the surface of the glass. When the cover 6 is in the position indicated in Fig. 1 its interior registers with the passageway 9, and the surface of the glass in the extension 2 is exposed to a heat approximating that in the melting chamber. The gate 10 serves to shield the cylinder being drawn, from the heat supplied through the passageway 9 (Fig. 2). Other advantages incident to the simplicity of the structure and its ease of operation will be readily apparent to those skilled in the art.

What we claim is:

In combination, a glass melting tank with its main portion roofed over and having a roofless extension at one side with side walls terminating adjacent the surface of the glass, an upright wall between the main portion of the tank and the extension, terminating above the level of the glass, and a drawing shell circular in cross section and open at the top floating partially submerged in the glass and adapted to be moved in such partially submerged position from the main portion of the tank beneath the said upright wall and into the said extension, the said shell containing a body of glass in free communication with the glass in which the shell floats and having substantially the same exterior diameter as that of the interior of the extension, so that when in drawing position the shell substantially fills the extension.

In testimony whereof we have hereunto signed our names in the presence of the subscribed witnesses.

WILLIAM L. CLAUSE.
ROGER S. PEASE.

Witnesses:
L. A. BAILEY,
E. H. MULL.